US009027605B2

(12) United States Patent
Williams

(10) Patent No.: US 9,027,605 B2
(45) Date of Patent: May 12, 2015

(54) PIPELINE REINFORCEMENT ASSEMBLY AND METHOD

(76) Inventor: B. Nash Williams, Midvale, UT (US)

( * ) Notice: Subject to any disclaimer, the term of this patent is extended or adjusted under 35 U.S.C. 154(b) by 440 days.

(21) Appl. No.: 13/290,022

(22) Filed: Nov. 4, 2011

(65) Prior Publication Data

US 2013/0112310 A1    May 9, 2013

(51) Int. Cl.
*F16L 9/00* (2006.01)
*F16L 55/175* (2006.01)

(52) U.S. Cl.
CPC .......... *F16L 55/175* (2013.01); *Y10T 29/49826* (2015.01)

(58) Field of Classification Search
CPC .............. F16L 55/175; B29C 44/1242; Y10T 29/49826
USPC ...................................... 138/97–99
See application file for complete search history.

(56) References Cited

U.S. PATENT DOCUMENTS

| | | | |
|---|---|---|---|
| 633,607 A * | 9/1899 | O'Malley | 138/99 |
| 1,051,086 A | 1/1913 | Clark | |
| 1,568,268 A | 1/1926 | Clark et al. | |
| 1,877,094 A | 9/1932 | Walborn | |
| 1,940,729 A | 12/1933 | Pfefferle | |
| 1,964,642 A | 6/1934 | McCoy | |
| 2,188,302 A | 1/1940 | Pfefferie et al. | |
| 2,785,912 A | 3/1957 | Risley et al. | |
| 3,396,753 A | 8/1968 | Foster et al. | |
| 3,480,043 A | 11/1969 | Proudfoot et al. | |
| 3,954,288 A | 5/1976 | Smith | |
| 4,049,480 A * | 9/1977 | Kutschke | 156/94 |
| 4,111,234 A | 9/1978 | Wells et al. | |
| 4,153,656 A * | 5/1979 | Bunyan | 264/40.1 |
| 4,240,650 A | 12/1980 | Adams | |
| 4,323,526 A * | 4/1982 | Hilbush, III | 264/36.16 |
| 4,603,893 A | 8/1986 | Takahashi | |
| 4,673,122 A | 6/1987 | Dubey | |
| 4,709,729 A | 12/1987 | Harrison | |
| 4,756,338 A | 7/1988 | Guyatt et al. | |
| 5,345,972 A | 9/1994 | Goglio et al. | |
| 7,165,579 B2 | 1/2007 | Borland et al. | |
| 7,900,655 B2 * | 3/2011 | Morton et al. | 138/99 |
| 2006/0118191 A1 * | 6/2006 | Rice | 138/99 |

OTHER PUBLICATIONS

W.A. Bruce and W.E. Amend, Steel Sleeves vs. Composites for In-Service Pipeline Repair, Welding Journal, Jun. 2011, pp. 72-77, published in the United States of America.

* cited by examiner

*Primary Examiner* — Daniel R Shearer
(74) *Attorney, Agent, or Firm* — J. David Nelson

(57) ABSTRACT

An assembly and a method for reinforcing or repairing one or more segments of an existing pipeline, without taking the pipeline out of service and without the need for disassembling the existing pipeline segments that are to be repaired. The assembly incorporates a metallic reinforcement pipe, a front seal ring, a rear seal ring, a front seal ring retention assembly, a rear seal ring retention assembly, and a self-hardening medium receiver. The reinforcement pipe and the seal rings create an annular space between the respective ends of the reinforcement pipe and the external surface of the existing pipeline. The seal rings, seal ring retention assemblies, and the flexible reinforcement pipe, accommodate out-of-round and joint angular displacement conditions of the existing pipeline. A self-hardening medium is injected into the annular space and pressure is maintained on the medium until the medium has set.

38 Claims, 9 Drawing Sheets

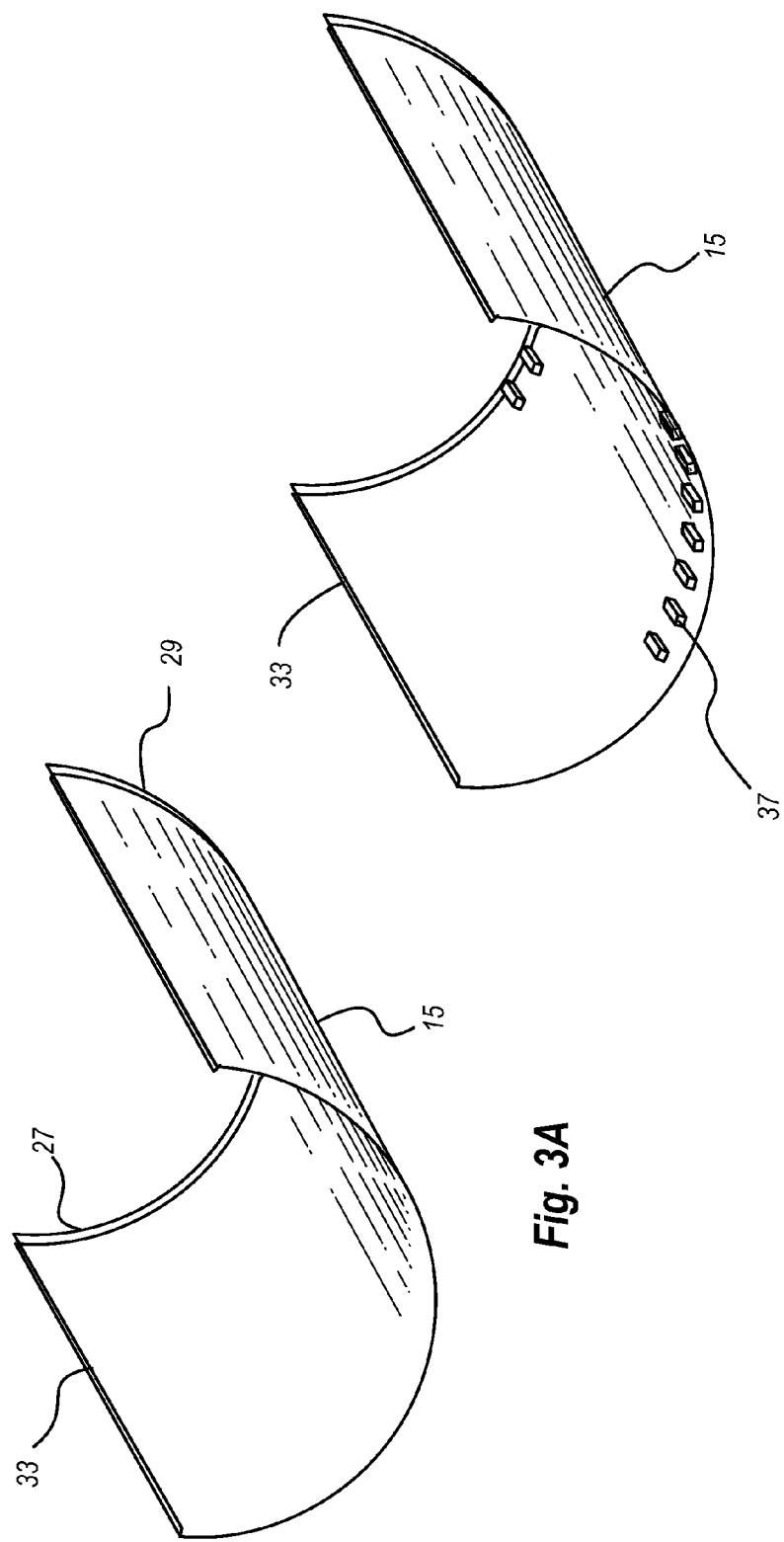

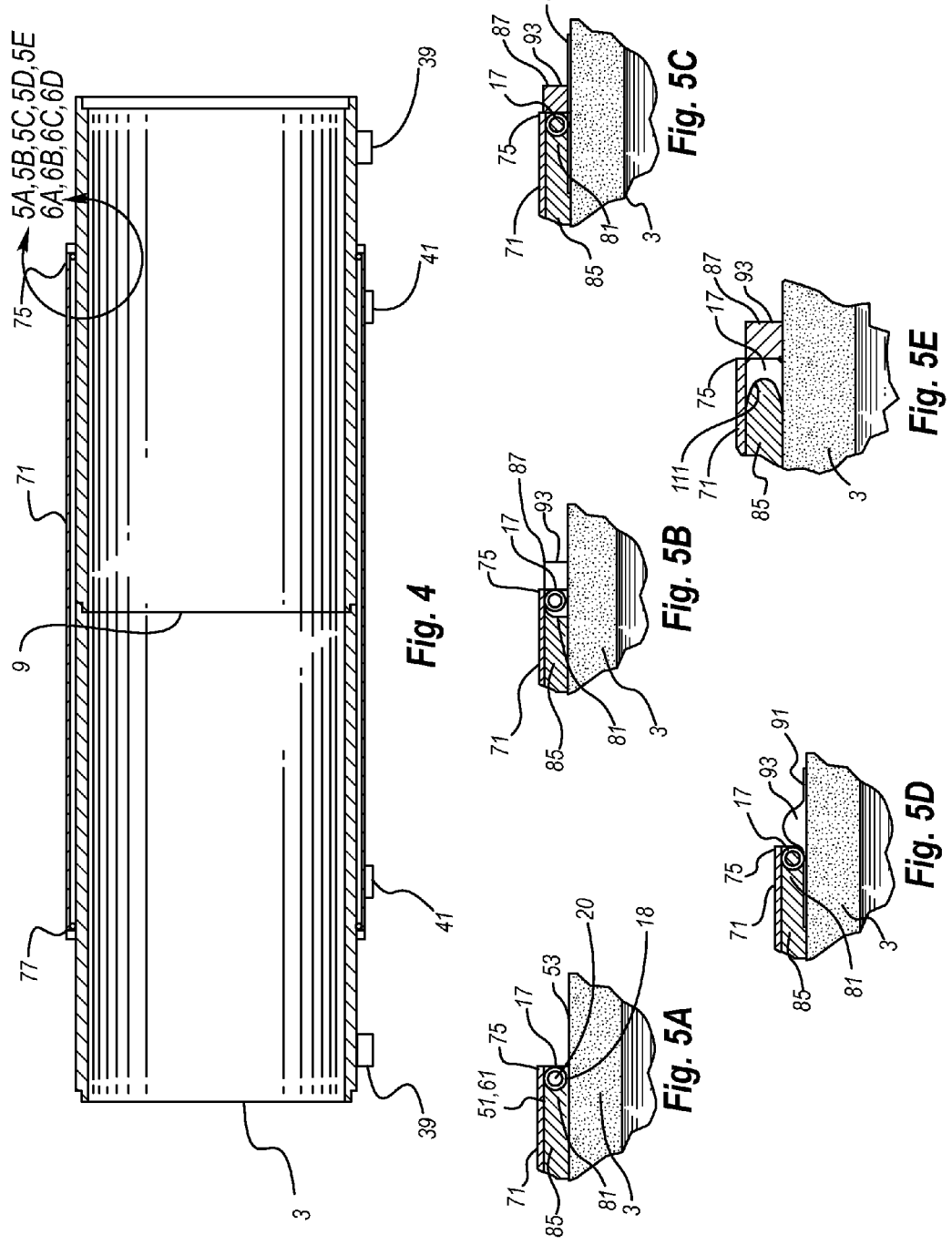

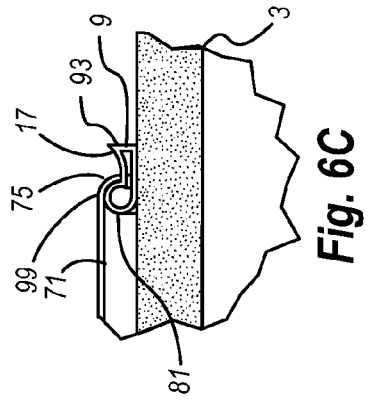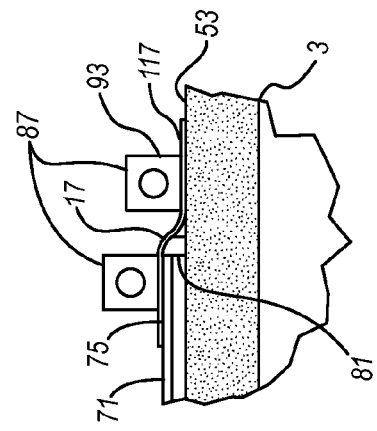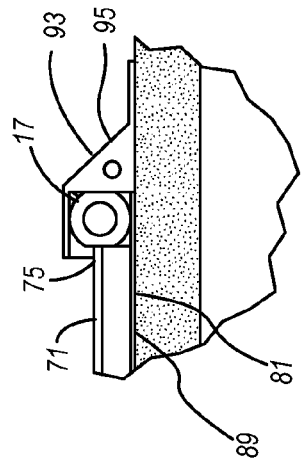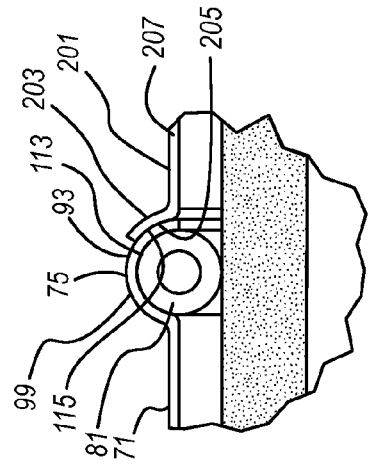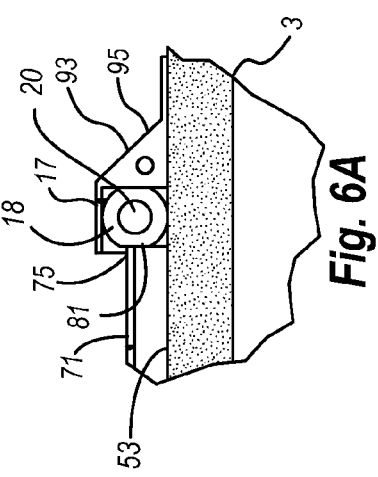

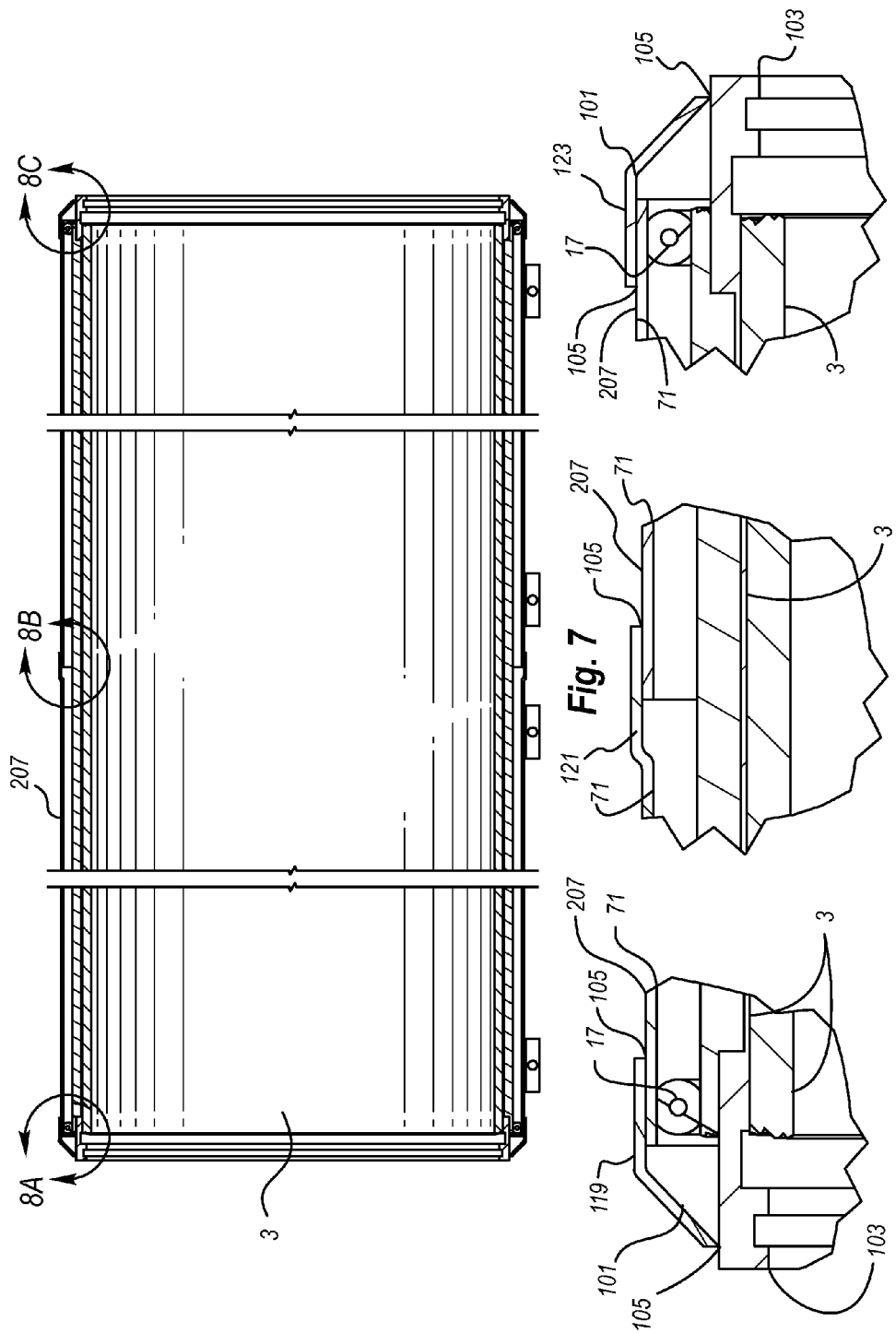

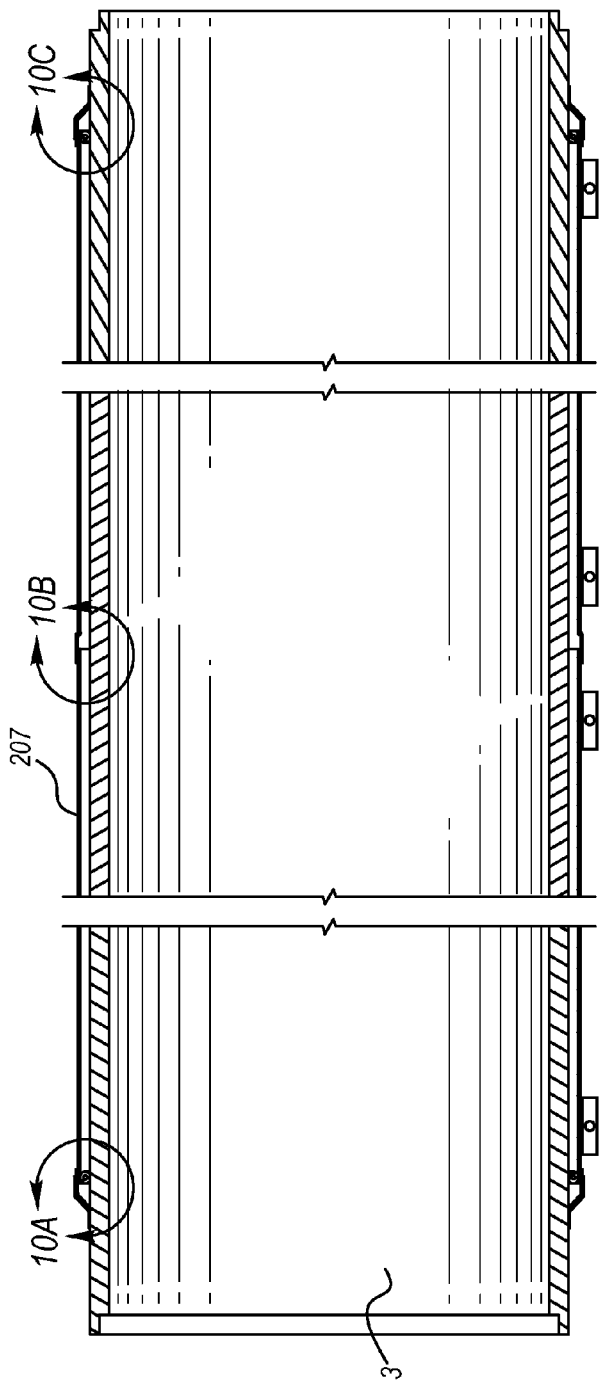
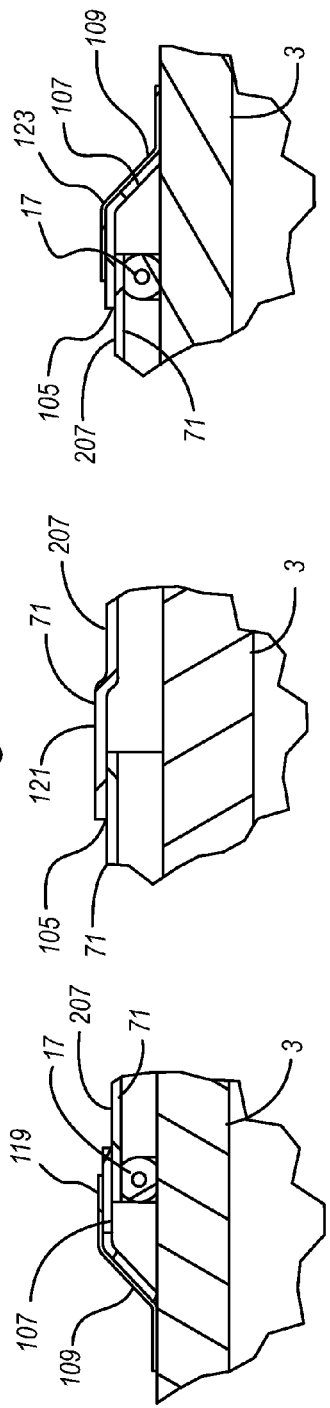

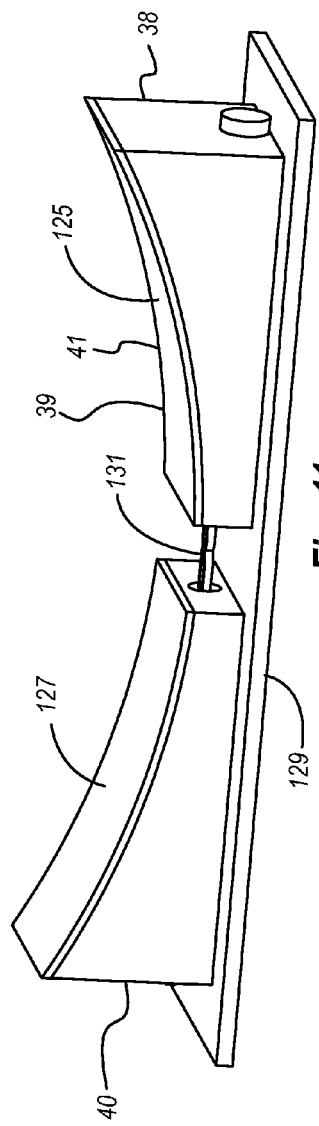
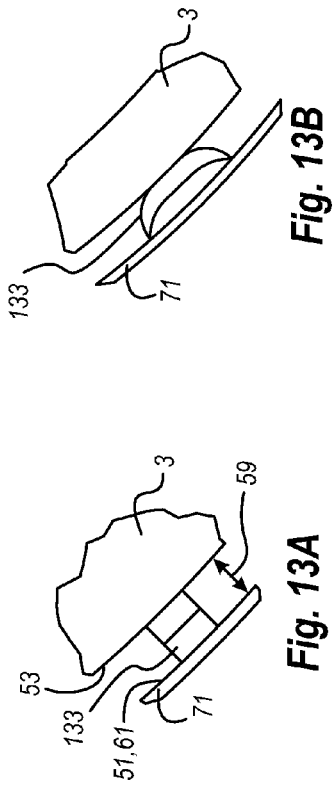
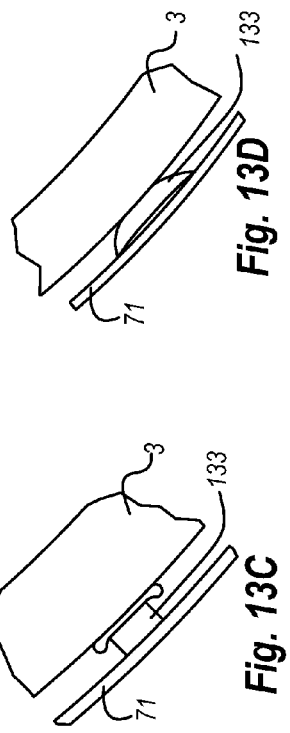
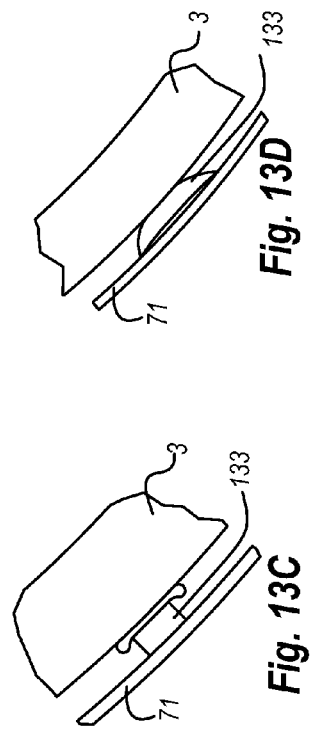
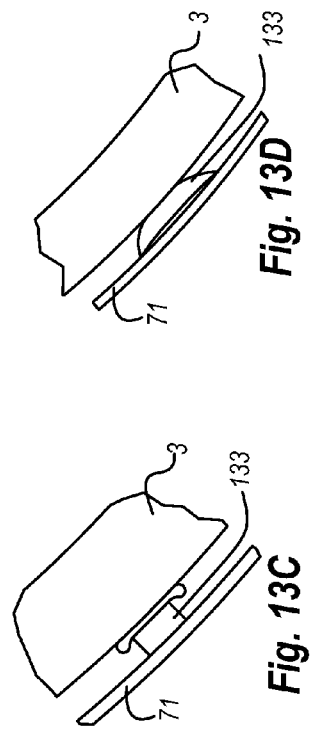
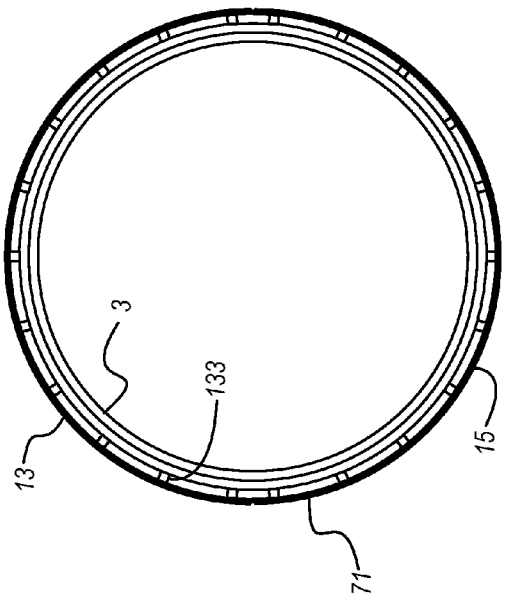

PIPELINE REINFORCEMENT ASSEMBLY AND METHOD

FIELD OF THE INVENTION

This invention is in the field of devices and methods for pipe reinforcement and repair and, in particular, in the field of devices and methods for externally structurally reinforcing or repairing segments of existing pipelines while retaining the existing pipelines in place and, if needed, in service.

BACKGROUND OF THE INVENTION

Many pipelines currently in operation have become structurally deficient due to corrosion, erosion or other causes which damage the structural integrity of the pipeline. Some structural deficiencies may have been caused by defects in the original design, defects in the manufacturing process, incorrect installation, or the effects of corrosion due to age. These structural deficiencies may be intermittent or continuous in nature. In addition, some pipeline systems have increased operating demands and would benefit from an increase in the allowable pressure of the existing pipe and the corresponding flow capacity increase.

The operators of these pipelines are frequently dependent on the pipelines and are unable to discontinue use without severe consequences. Often it is not economically feasible to replace the system, such as when the deficiencies are intermittent in nature or when the pipeline cannot be taken out of service.

Whether the pipelines are transmitting water or some other fluid, the passage of time results in increased incidents of leakage and increasing concerns over the structural integrity of the pipeline. In some situations, a new pipeline can and will be constructed to replace the existing pipeline. The new pipeline will be placed in service and the old pipeline removed or simply abandoned. In many situations, however, the replacement of the pipeline is economically or functionally infeasible. The cost may be prohibitive. Constructing a parallel pipeline may be difficult or impossible and retaining the existing pipeline in service may be essential. Thus, in many situations, a system and method for reinforcing or repairing an existing pipeline while retaining the pipeline in service is seriously needed.

A number of systems and methods have been developed for repairing pipeline segments in place, such as the system and method disclosed in U.S. Pat. No. 7,165,579 to Borland, et al. Each of the prior art systems and methods have provided a technically feasible system or method for making a repair to the existing pipeline, and have done so with varying degrees of success. Many of the pipelines needing reinforcement or repair are large diameter, exceeding 12 feet in diameter, and have inconsistent external dimensions or have external mortar coatings. Prior art systems are not easily adaptable to these pipe sizes or external surface irregularities. Prior art systems utilize and require rigid enclosures to assure that a gasket maintains intimate contact with the existing pipeline and the enclosure so as to provide that the system is sealed. Some prior art systems are connected to the existing pipeline in such a way as to render them inflexible.

Prior art disclosures include systems utilizing half-shell enclosures wherein bolts are utilized to rigidly center the half shells around the existing pipeline and gaskets combined with hardware provide end seals to allow injecting resin at high pressure into the annular void. Such a system is limited to use with existing pipe having very accurate and uniform pipe dimensions and gasket seats for such a system require a rigid cylinder for the enclosure in order for the gasket to seal during pressurization. Further, a gasket seal system does not provide an effective means to seal against a concrete or mortar coated pipeline. In contrast the current invention provides a flexible enclosure with passive centering means, including end seals which allow the enclosure to be rounded upon pressurization. Unlike many other prior art devices, the seal rings and the seal retainers of the current invention do not interfere with joining multiple overlapping enclosures to provide a lengthened sealed enclosure system. Embodiments of the enclosure of the present invention allow maintaining a seal against an irregular surface such as concrete or mortar coated pipelines. When combining the enclosure system of the present invention with the pipeline support system of the present invention, the work space requirements such as the excavation for a buried pipeline will be minimized. This support system also provides the means to continue with multiple enclosures while supporting the existing pipeline or enclosure.

Other prior art disclosures include repair systems which include custom fabricated shapes intended for a specific localized repair and do not provide for adjustments necessary for irregularities in the existing pipeline. Also, they are intended for localized repair and do not provide for interconnecting enclosures to create a continuous and extendable repair. For these systems, rounding of the cylinder is prohibited as the geometry of the fabricated shape causes the cylinder to become rigid. Bolted embodiments of these systems require a rigid structure in order for the bolted assembly to retain its shape and seals. A tapping tool is utilized to pierce the existing pipeline and pressurize the annular space within the enclosure. Such systems seem well suited for repair of petroleum pipelines with uniform external dimensions.

Other prior art systems provide a clamp style repair device and utilize a liquid sealant. These systems require a rigid structure which is further complicated by the need to heat the device before installing to assure a shrink to fit assembly will seal the device edges. These devices are intended for a localized repair and for use with existing pipelines with uniform existing pipe dimensions to work properly. The protruding hardware of these systems makes the use of coatings for corrosion protection very difficult and indicates the system is only intended for localized repairs.

It is an objective of the present invention to provide a system and method for pipeline reinforcement which is more economical, both as to materials and labor, easier and faster to install, and more reliable than the prior art systems and methods.

It is a further objective of the present invention to provide a pipeline reinforcement system and method that provides for the ready reinforcement of contiguous segments of pipeline.

It is a further objective of the present invention to provide a pipeline reinforcement system and method that provides for the ready reinforcement of contiguous segments of pipeline; provides for the temporary suspension of pipeline reinforcement construction, leaving the reinforced sections in a structurally sound condition; and provides for the resumption of pipeline reinforcement construction for sections contiguous to sections completed prior to the suspension at a later date without the need for modification to the system.

It is a further objective of the present invention to provide a system and method for repairing stretches of pipeline involving multiple pipeline segments with a continuous external pipe enclosure.

It is a further objective of the present invention to provide a pipeline reinforcement system and method which provides a round and cylindrical reinforcement pipe, for each section of existing pipe reinforced, regardless of whether the existing pipeline is round or out-of-round.

It is a further objective of the present invention to provide a system and method for pipeline reinforcement that uses a "flexible" pipe design for a pipe enclosure. The meaning of the term "flexible" as applied to reinforcement pipe sections for purposes of this application is provided hereafter.

SUMMARY OF THE INVENTION

Although the present invention is deployable with rigid enclosure pipe, the present invention offers the distinct advantage over prior art devices and methods because it is particularly adapted for use with "flexible" reinforcement pipe, which is defined hereafter in this application.

A preferred embodiment of the pipe reinforcement assembly of the present invention has a reinforcement pipe top, a reinforcement pipe bottom, a front seal ring and a rear seal ring. Although a preferred embodiment of the enclosure of the present invention, namely the reinforcement pipe, has two laterally arcuate enclosure plates, the reinforcement pipe top and the reinforcement pipe bottom, the reinforcement pipe may incorporate more than two laterally arcuate enclosure plates. The enclosure plates have an internal surface with a common and uniform lateral radius of curvature, the radius of curvature being greater than the existing pipe external radius. The enclosure plates are fitted together longitudinally to form a flexible, cylindrical enclosure for the existing pipeline segment being reinforced.

In a preferred method of the present invention, the existing pipeline may be supported by existing pipeline supports of the present invention, the reinforcement pipe bottom is then fed beneath the existing pipeline and positioned with the radial center line approximately beneath the existing pipe joint. Reinforcement pipe supports of the present invention may be used to position the reinforcement pipe bottom immediately beneath the existing pipeline with the reinforcement pipe bottom internal surface separated from the existing pipe external surface by a desired clearance. Clearance spacers may be pre-attached to the internal surface of the reinforcement pipe bottom so that when the reinforcement pipe bottom is positioned beneath the existing pipeline and supported by the reinforcement pipe supports, the internal surface of the reinforcement pipe bottom is separated from the external surface of the existing pipeline by the desired reinforcement pipe clearance.

The reinforcement pipe top is then positioned over the existing pipeline with the reinforcement pipe top longitudinal edges mating with the reinforcement pipe bottom longitudinal edges, and the reinforcement pipe top front radial edge being longitudinally matched with the reinforcement pipe bottom front radial edge, and the reinforcement pipe top rear radial edge being longitudinally aligned with the reinforcement pipe bottom rear radial edge. The existing pipeline external radius and the reinforcement pipe internal radius providing for the desired clearance.

For a preferred embodiment, the reinforcement top longitudinal edges may be welded to the reinforcement bottom longitudinal edges. Although welding is a preferred methodology for joining the reinforcement pipe top to the reinforcement pipe bottom, other means will be known to persons skilled in the art, such as mechanical joints.

For a preferred embodiment shown, the reinforcement pipe top and the reinforcement pipe bottom have an expanded pipe end at the respective rear radial edges. This provides for the joining of successive reinforcement pipes assemblies, thereby providing for a continuous reinforcement pipe for a pipeline segment including multiple segments of the existing pipeline.

After the reinforcement pipe top and the reinforcement pipe bottom have been appropriately positioned with a pipeline clearance between the internal surfaces respectively of the reinforcement pipe top and the reinforcement pipe bottom, and the pipeline external surface, and the longitudinal edges of the reinforcement pipe top and a reinforcement pipe bottom have been welded, or otherwise permanently connected to form the longitudinal joints, thereby forming reinforcement pipe, the front seal ring and the rear seal ring are installed. In a preferred embodiment the seal rings are made of a flexible, resilient, compressible material and hence each would preferably be made in one piece with the ends brought together as the front seal ring is inserted at the reinforcement pipe front end in the front edge annular space between the reinforcement pipe and the existing pipe and the rear seal ring is inserted at the reinforcement pipe rear end in the rear edge annular space between the reinforcement pipe and the existing pipeline.

In a preferred embodiment of the method of the present invention, the injection of self-hardening medium, into the annular space between the existing pipe and the reinforcement pipe, is accomplished through a medium receiver at a pressure that is sufficient, when the annular space is completely filled, to overcome gravitational and other forces on the reinforcement pipe and to force the reinforcement pipe to a true circular cross-section and a true cylindrical shape. In a preferred embodiment of the method of the present invention, a pressure is maintained that is sufficient to preserve the circular cross-section and true cylindrical shape until the self-hardening medium has hardened.

The inventor prefers to use an expanding grout as the medium because it expands during curing, rather than shrinking as many grouts do. The end result of this preferred embodiment of the method of the present invention is a true cylindrical reinforcement pipe which carries or reinforces the pressure capacity of the existing pipeline and evenly disburses the hoop stress and the other loads imposed on the reinforcement pipe by the existing pipeline. As stated above, the expanding grout can result in the pre-stressing of the reinforcement pipe, immediately transferring loads to the reinforcement pipe. This can be particularly important in the reinforcement of an existing pipe which is experiencing a failure or deterioration of its hoop stress structural capacity.

BRIEF DESCRIPTION OF THE DRAWINGS

FIG. 3a is a front perspective view detail of a reinforcement pipe bottom of the present invention without clearance spacers.

FIG. 3b is a front perspective view detail of a reinforcement pipe bottom of the present invention with clearance spacers.

FIG. 4 is a vertical longitudinal cross-section of a reinforcement pipe of the present invention installed on an existing pipeline, approximately centered on the joint between two existing pipe sections.

FIG. 5A is a cross section detail for a preferred embodiment of a front seal ring as inserted to a reinforcement pipe of the present invention in a front edge annular space between the reinforcement pipe internal surface and the existing pipeline external surface.

FIG. 5B is a cross section detail of a preferred embodiment of a seal ring retention assembly of the present invention which incorporates a clamping retainer to retain the seal ring.

FIG. 5C is a cross section detail of a preferred embodiment of a seal ring retention assembly of the present invention which incorporates a shrinkable sleeve and a clamping retainer to retain the seal ring.

FIG. 5D is a cross section detail of a preferred embodiment of a seal ring retention assembly of the present invention which incorporates a shrinkable sleeve seal with an integral seal retainer.

FIG. 5E is a cross section detail of an alternative embodiment of a seal ring of the present invention with a concave inside surface and a clamping retainer.

FIG. 6A is a cross section detail of an alternative embodiment of the seal ring and the seal ring retention assembly of the present invention.

FIG. 6B is a cross section detail of an alternative embodiment of the seal ring and the seal ring retention assembly of the present invention.

FIG. 6C is a cross section detail of an alternative embodiment of the seal ring and the seal ring retention assembly of the present invention which may be used with a reinforcement pipe of the present invention having a contracted reinforcement pipe front end.

FIG. 6D is a cross section detail of an alternative embodiment of the seal ring and the seal ring retention assembly of the present invention which may be used with a reinforcement pipe of the present invention having a contracted reinforcement pipe front end.

FIG. 6E is a cross section detail of an alternative embodiment of the seal ring and the seal ring retention assembly of the present invention wherein a bowed reinforcement pipe front end and an oversized seal ring provide for the retention and positioning of the seal ring.

FIG. 6F is a cross section detail of an alternative embodiment of the seal ring and the seal ring retention assembly of the present invention which incorporates a shrink sleeve.

FIG. 7 is a vertical longitudinal cross section of an existing pipeline with a continuous reinforcement pipe of the present invention reinforcing two or more existing pipe sections.

FIG. 8A is a cross section detail of a preferred embodiment of a reinforcement pipe first termination joint assembly.

FIG. 8B is a cross section detail of a preferred embodiment of a reinforcement pipe continuation joint assembly.

FIG. 8C is a cross section detail of a preferred embodiment of a reinforcement pipe first termination joint assembly.

FIG. 9 is a vertical longitudinal cross section of an existing pipeline with a continuous reinforcement pipe of the present invention reinforcing two or more existing pipe sections.

FIG. 10A is a cross section detail of a preferred embodiment of a reinforcement pipe first termination joint assembly.

FIG. 10B is a cross section detail of a preferred embodiment of a reinforcement pipe continuation joint assembly.

FIG. 10C is a cross section detail of a preferred embodiment of a reinforcement pipe first termination joint assembly.

FIG. 11 is a front perspective view of a preferred embodiment of a support system of the present invention with support wedge assemblies.

FIG. 12 is a cross-section of an embodiment of the reinforcement pipe of the present invention installed on an existing pipe section with spacers providing the desired pipeline clearance.

FIG. 13A is a cross section detail of a preferred embodiment of a clearance spacer installed between the existing pipe external surface and the reinforcement pipe internal surface.

FIG. 13B is a cross section detail of a preferred embodiment of a clearance spacer installed between the existing pipe external surface and the reinforcement pipe internal surface.

FIG. 13C is a cross section detail of a preferred embodiment of a clearance spacer installed between the existing pipe external surface and the reinforcement pipe internal surface.

FIG. 13D is a cross section detail of a preferred embodiment of a clearance spacer installed between the existing pipe external surface and the reinforcement pipe internal surface.

DETAILED DESCRIPTION OF PREFERRED EMBODIMENTS

As noted above, although the present invention is deployable with rigid enclosure pipe, the present invention offers the distinct advantage over prior art devices and methods because it is particularly adapted for use with "flexible" reinforcement pipe, i.e. "flexible" enclosure pipe. According to a commonly used criteria, "rigid" pipe is defined as pipe which will not allow deflections beyond 0.1% (1/10%) of the pipe diameter without damage to the structural integrity of the pipe. "Semi-rigid" pipe will generally not allow deflections beyond 2% of the pipe diameter without damage to the structural integrity of the pipe. According to commonly used criteria, a "flexible" pipe will allow deflections beyond 2% of the pipe diameter without damage to the structural integrity of the pipe. The deflections of a flexible conduit are generally thought to be limited to less than 20% of the conduit diameter but do not have a defined limitation. As stated, a distinct advantage of the pipe reinforcement assembly and method of the present invention is that it is adaptable to use and is intended for use with flexible reinforcement pipe. For this application, including the claims, the term "flexible", when used with the term "pipe", "reinforcement pipe", "reinforcement pipe top", "reinforcement pipe bottom", or "enclosure plate" shall be defined to mean a pipe, reinforcement pipe, reinforcement pipe top, reinforcement pipe bottom, or enclosure plate that allows deflections beyond the limits stated above for "rigid" and beyond the limits stated above for "semi-rigid" pipe.

Figure 1:
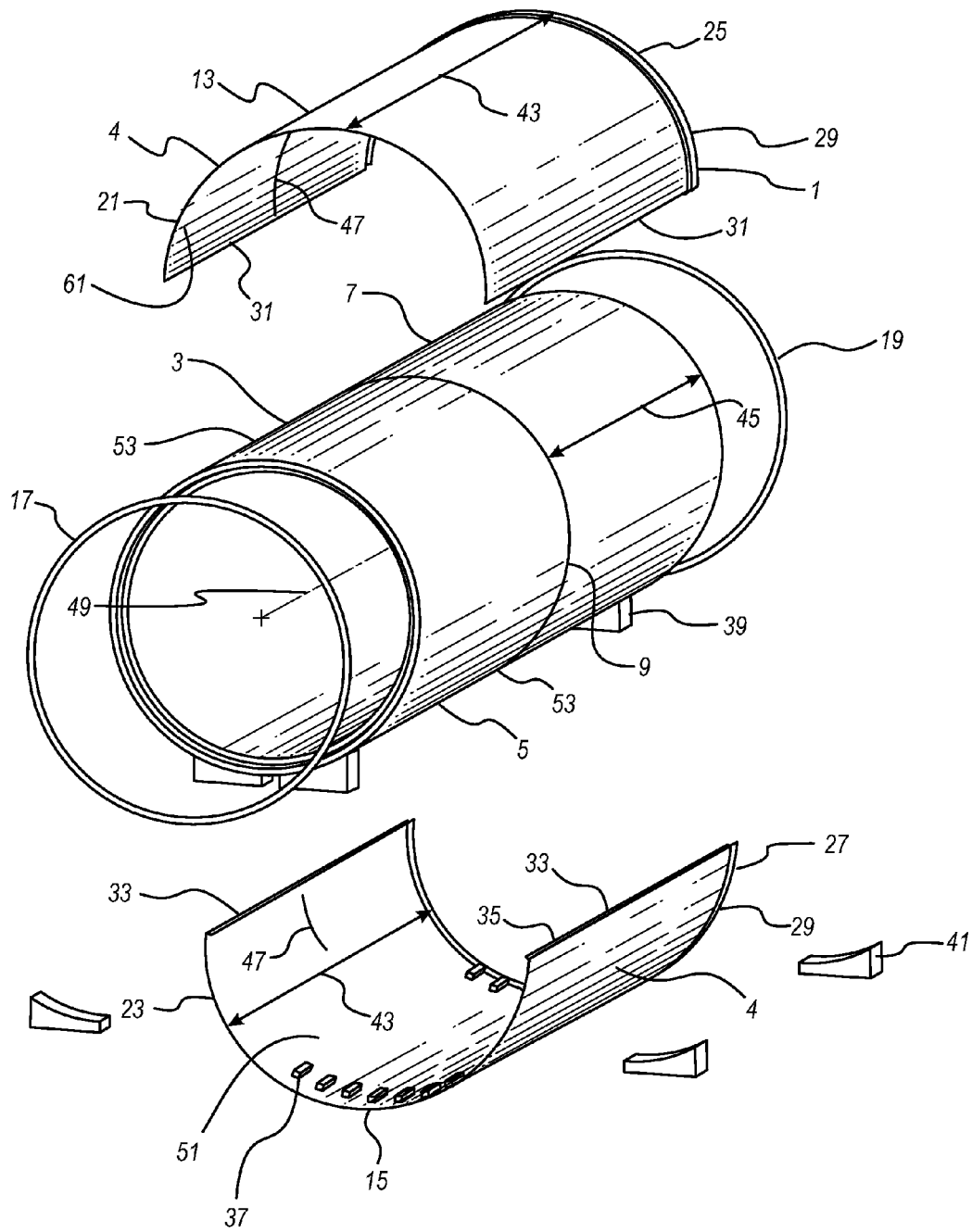
FIG. 1 is a front perspective, exploded view of a pipe reinforcement assembly of a preferred embodiment of the present invention.

Referring first to FIG. 1, a front view, perspective, exploded view of the pipe reinforcement assembly 1 of a preferred embodiment of the present invention is shown. In this illustration, two sections of an existing pipeline 3, a first pipe section 5 and a second pipe section 7, the pipe sections being connected at existing pipe joint 9. For the embodiment shown, portions of the first pipe section 5 and the second pipe section 7

The embodiment of the pipe reinforcement assembly 1 of the present invention shown in FIG. 1 has a reinforcement pipe top 13, a reinforcement pipe bottom 15, a front seal ring 17 and a rear seal ring 19. For the embodiment shown, the reinforcement pipe length 43 for the reinforcement pipe top 13 and the reinforcement pipe bottom 15 is approximately equal to the existing pipe section length 45, For other embodiments, however, the reinforcement pipe length 43 may differ from the existing pipe section length 45, and may be greater than or less than the existing pipe section length 45.

Figure 2:
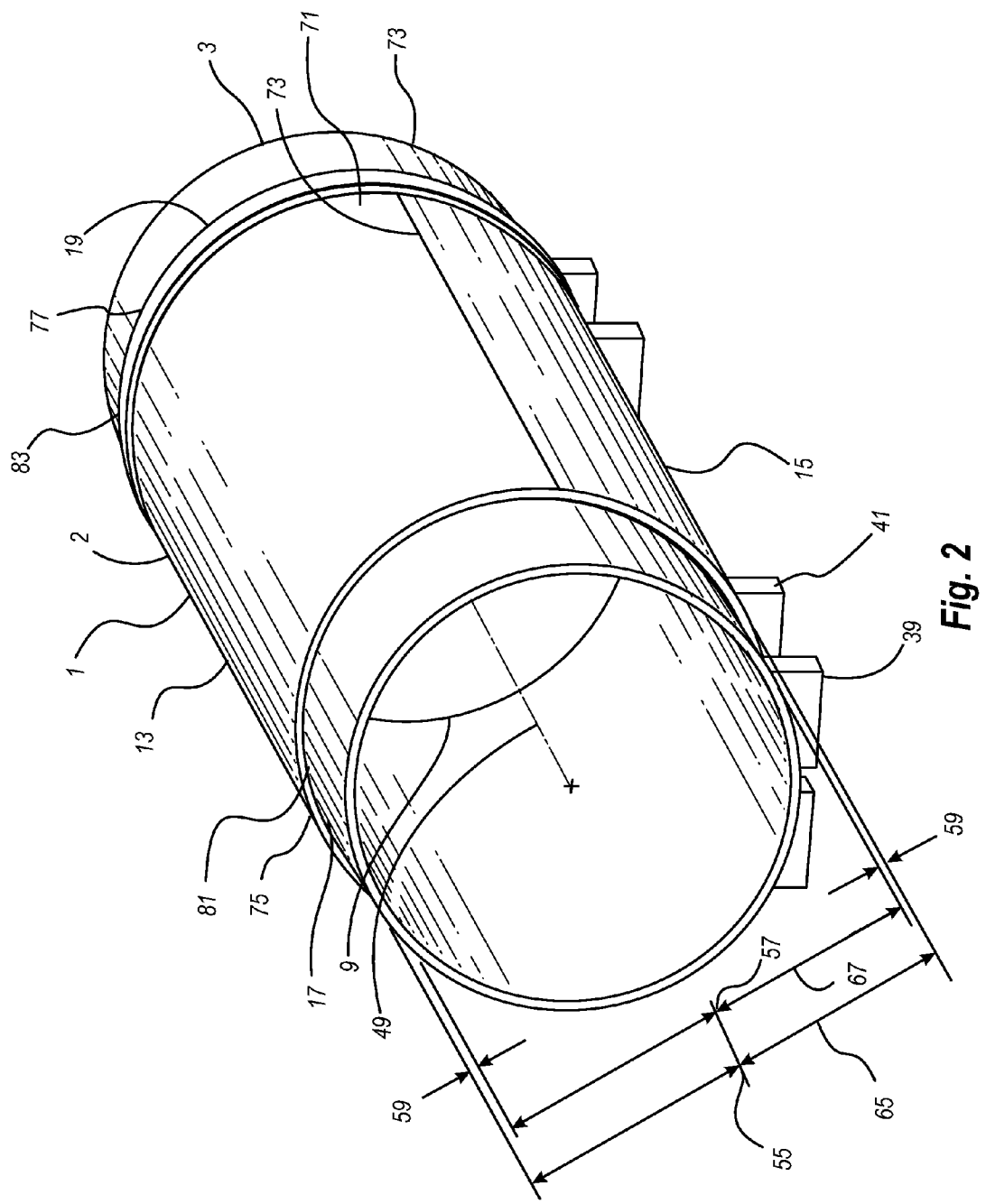
FIG. 2 is a front perspective view of a pipe reinforcement assembly of a preferred embodiment of the present invention.

Referring also to FIG. 2, although a preferred embodiment of the enclosure 2 of the present invention, namely the reinforcement pipe 71, has two laterally arcuate enclosure plates 4, namely a reinforcement pipe top 13 and a reinforcement pipe bottom 15 as shown in FIG. 1 and FIG. 2, the reinforcement pipe 71 may incorporate more than two laterally arcuate enclosure plates 4, each of the enclosure plates having an internal surface with a common and uniform lateral radius of curvature 65, the radius of curvature being greater than the existing pipe external radius 67, the enclosure plates being fitted together longitudinally to form a flexible, cylindrical enclosure 2 for the pipeline segment, the enclosure, namely the reinforcement pipe 71, having an internal surface and opposing ends, a first enclosure end and a second enclosure end, which, for the preferred embodiment shown in FIG. 1 and FIG. 2, are the reinforcement pipe front end 75 and the reinforcement pipe rear end 77. For purposes of this application, the terms "longitudinal" and "longitudinally" shall be defined to mean generally longitudinal with respect to the centerline of the existing pipeline, but not necessarily exactly parallel to the centerline of the existing pipeline. For the embodiment shown, the existing pipe segment which is reinforced by the reinforcement pipe 71 includes portions of the first pipe section 5 and the second pipe section 7, including the existing pipe joint 9 between the two sections.

In a preferred method of the present invention, utilizing the embodiment of the reinforcement pipe assembly 1 shown in FIG. 1, the existing pipeline 3 may be supported by existing pipeline supports 39. The reinforcement pipe bottom 15 is then fed beneath the existing pipeline and positioned with the radial center line 47 approximately beneath the existing pipe joint 9. Reinforcement pipe supports 41 may be used to position the reinforcement pipe bottom immediately beneath the existing pipeline with the reinforcement pipe bottom internal surface 51 separated from the existing pipe external surface 53 by a desired clearance 59 as shown on FIG. 2. Referring also to FIG. 3B, as shown in FIG. 1, for an alternative embodiment, clearance spacers 37 may be pre-attached to the internal surface 51 of the reinforcement pipe bottom 15, the radial thickness of the clearance spacers 37 being equal to the desired clearance 59, so that when the reinforcement pipe bottom is positioned beneath the existing pipeline and supported by the reinforcement pipe supports 41, the internal surface 51 of the reinforcement pipe bottom is separated from the external surface 53 of the existing pipeline by the desired reinforcement pipe clearance 59. Alternatively, the spacers may be secured to the existing pipeline or no clearance spacers 37 may be used for the reinforcement pipe bottom 15 as shown in FIG. 3A.

The reinforcement pipe top 13 is then positioned over the existing pipeline with the reinforcement pipe top longitudinal edges 31 mating with the reinforcement pipe bottom longitudinal edges 33, and the reinforcement pipe top front radial edge 21 being longitudinally matched with the reinforcement pipe bottom front radial edge 23, and the reinforcement pipe top rear radial edge 25 being longitudinally aligned with the reinforcement pipe bottom rear radial edge 27 as shown in FIG. 2. The existing pipeline external diameter 57 and hence the existing pipeline external radius 67 and the reinforcement pipe internal diameter 55 and hence the reinforcement pipe internal radius 65 providing for the desired clearance 59 as shown in FIG. 2.

For a preferred embodiment, the reinforcement top longitudinal edges 31 may be welded to the reinforcement bottom longitudinal edges 33. For the embodiment shown in FIG. 1, the reinforcement bottom longitudinal edges have an edge backing 35 which assists in the positioning of the reinforcement pipe top on the reinforcement pipe bottom and in the subsequent welding of the reinforcement pipe top to the reinforcement pipe bottom. Although welding is a preferred methodology for joining the reinforcement pipe top to the reinforcement pipe bottom, other means will be known to persons skilled in the art, such as mechanical joints.

For the embodiment shown, the reinforcement pipe top 13 and the reinforcement pipe bottom 15 have an expanded pipe end 29 at the respective rear radial edges 25, 27. This provides for the joining of successive reinforcement pipes assemblies 1, thereby providing for a continuous reinforcement pipe for multiple segments of the existing pipeline 3.

Referring again to FIG. 2, after the reinforcement pipe top 13 and the reinforcement pipe bottom 15 have been appropriately positioned with a pipeline clearance 59 between the internal surfaces respectively 51 and 61 of the reinforcement pipe top and the reinforcement pipe bottom, and the pipeline external surface 53, and the longitudinal edges of the reinforcement pipe top and a reinforcement pipe bottom have been welded, or otherwise permanently connected to form the longitudinal joints 73, thereby forming reinforcement pipe 71, the front seal ring 17 and the rear seal ring 19 are installed. In a preferred embodiment the seal rings 17, 19, are made of a flexible, resilient, compressible material and hence each would preferably be made in one piece with the ends brought together as the front seal ring 17 is inserted at the reinforcement pipe front end 75 of the reinforcement pipe 71 in the front edge annular space 81 between the reinforcement pipe 71 and the existing pipe 3 and the rear seal ring 19 is inserted at the reinforcement pipe rear end 77 and the rear edge annular space 83 between the reinforcement pipe 71 and the existing pipeline 3.

Referring to FIG. 4, a vertical longitudinal cross-section of a reinforcement pipe 71 as installed on an existing pipeline, approximately centered on the joint between two existing pipe sections is shown. Referring also to FIG. 5A, a cross section detail is shown for a preferred embodiment of a front seal ring 17 as inserted to the reinforcement pipe 71 in the front edge annular space 81 between the reinforcement pipe internal surface 51, 61, and the existing pipeline external surface 53. FIGS. 5B, 5C and 5D show several preferred embodiments of seal ring retention assemblies 93 which retain the seal ring 17 in the position shown in FIG. 5A, as a time hardening material is injected in the annular space 85 and pressurized as described below. FIG. 5B illustrates the use of a clamping retainer 87 to retain the seal ring 17. FIG. 5C illustrates the use of a shrinkable sleeve seal 89, which typically has an adhesive backing to provide for a positive seal between the existing pipe 3 and the shrinkable sleeve seal 89, and a clamping retainer 87. FIG. 5D illustrates the use of a shrinkable sleeve seal with an integral seal retainer 91. FIG. 5E illustrates the use of an alternative embodiment of a seal ring 17, with a concave inside surface 111 to enhance the sealing capability of the seal ring, and a clamping retainer 87.

Referring now to FIG. 6A-6D, details of additional alternative embodiments of the seal ring 17 and the seal ring retention assembly 93 are shown. FIG. 6A illustrates the use of a seal ring that is larger than the front edge annular space 81 between the reinforcement pipe front end 75 and the existing pipeline external surface 53 and is held adjacent to the reinforcement pipe front end 75 by an expanded clamping retainer 95. Referring to FIG. 6B, an embodiment of the seal ring 17 and the seal ring retention assembly 93 is shown that is similar to that shown in FIG. 6A except that a shrinkable sleeve seal 89 has been added. As noted above, the shrinkable sleeve seals 89 are typically installed with adhesive backing. Referring now to FIG. 6C, an embodiment of the seal ring is shown which may be used with a reinforcement pipe 71 with a contracted reinforcement pipe front end 99. FIG. 6D illustrates a seal ring and seal retainer assembly similar to that shown in FIG. 6C with a shrinkable sleeve seal 89 added. FIG. 6E illustrates a seal ring and seal retainer assembly wherein a bowed reinforcement pipe front end 113 and an oversized seal ring 17 provide for the retention and positioning of the seal ring 17. For this embodiment, a contiguous reinforcement pipe 201 has a contiguous reinforcement pipe rear end 203 with a rear end receiver surface 205 which mates with a front end receiver surface 115 of the reinforcement pipe 71 and allows the reinforcement pipe front end 75 to be welded or otherwise joined to the contiguous reinforcement pipe rear end 203 thereby forming a continuous reinforcement pipe 207. FIG. 6F illustrates the use of a shrink sleeve 117 affixed to the existing pipe external surface 53 and the reinforcement pipe 71 respectively by a pair of clamping retainers 87, to retain the real ring 17 and seal the reinforcement pipe front end 75.

Other seal ring retention assemblies 93 for retaining the seal ring 17 in place in the annular space 81, 83 will be obvious to a person of ordinary skill in the art, in view of the drawings and descriptions presented in this application.

Referring again to FIG. 5A and FIG. 6A, for example, a preferred type of seal ring 17 comprises a flexible tubular member 18, such as a neoprene tube, with an internal fluid chamber 20 which can be injected with and pressurized with a seal fluid, such as a liquid or air, to expand the seal ring 17 to fill the front edge annular space 81 and the rear edge annular space 83 respectively. The seal ring material will generally be supplied on a roll and cut to the proper length in the field at the time of installation. A field splice is required to join the ends of seal ring and to attach and imbed a seal ring manifold for use in injecting the seal fluid. The utilization of a liquid or non-compressible seal fluid is preferred because it will allow rounding of the enclosure, i.e. the reinforcement pipe, without loss of the seal. Some embodiments of the seal ring retention assembly 93 of the current invention incorporates a mastic coated shrink sleeve 89 under the seal ring 17 to smooth surface irregularities such as found on concrete or mortar coated pipelines. Other embodiments of the seal ring utilize a pliant geometric shaped seal which deforms, under pressure, to occupy and seal the annular space between the enclosure ends and the existing pipe. Other embodiments of the seal ring utilize a shaped pliant compressible material such as a gasket which is removably attached against the ends of the enclosure and retained by use of metal hardware segments which are secured in position with a tensioned cable. Upon completing the injection and hardening of the medium, the securing cables are released and the previously secured seals are removed in preparation for contiguous enclosures or a termination of the system.

Also, if it is desired that the self-hardening medium be injected directly to the annular space at the front pipe end or the rear pipe end, or both, without the use of a medium receiver in the reinforcement pipe itself, the seal ring may have a medium receiver which is an injection penetration passing through and imbedded in the seal ring.

Referring now to FIG. 7, a vertical longitudinal cross section of an existing pipeline 3 with a continuous reinforcement pipe 207 reinforcing two or more existing pipe sections is illustrated. Referring also to FIGS. 8A, 8B and 8C, preferred embodiments of a reinforcement pipe first termination joint 119 assembly, a reinforcement pipe continuation joint assembly 121, and a reinforcement pipe second termination joint assembly 123, respectively are shown for this type of existing pipeline. These details illustrate the termination of a continuous reinforcement pipe 207 and a preferred embodiment of a termination assembly for attaching the ends of the continuous reinforcement pipe to this type of existing pipeline by welding a termination member 101 to the existing pipe.

Referring now to FIG. 9, a vertical longitudinal cross section of an existing pipeline 3 with a continuous reinforcement pipe 207 reinforcing two or more existing pipe sections is illustrated. Referring also to FIGS. 10A, 10B and 10C, preferred embodiments of a reinforcement pipe first termination joint 119 assembly, a reinforcement pipe continuation joint assembly 121, and a reinforcement pipe second termination joint assembly 123, respectively are shown for this type of existing pipeline. These details illustrate the termination of a continuous reinforcement pipe 207 and a preferred embodiment of a termination assembly for attaching the ends of the continuous reinforcement pipe to this type of existing pipeline by attaching a termination member 107 to the existing pipeline by a termination shrink sleeve 109.

Referring now to FIG. 12, a cross-section of an embodiment of the reinforcement pipe 71 of the present invention installed on an existing pipe section 3, with spacers 133 providing the desired pipeline clearance 59 between the existing pipe external surface 53 and the reinforcement pipe internal surface 51, 61. Referring also to FIGS. 13A-13D, cross-section details of embodiments with spacers 133 are shown. Utilization of spacers aids in the installation of the reinforcement pipe bottom 15 and the reinforcement pipe top 13, but particularly the reinforcement pipe bottom 15, and help minimize damage to the reinforcement pipe bottom or top during placement, positioning and installation. Spacers may be used for the reinforcement pipe bottom, the reinforcement pipe top, both the reinforcement pipe bottom and the reinforcement pipe top, or neither.

Figure 14:
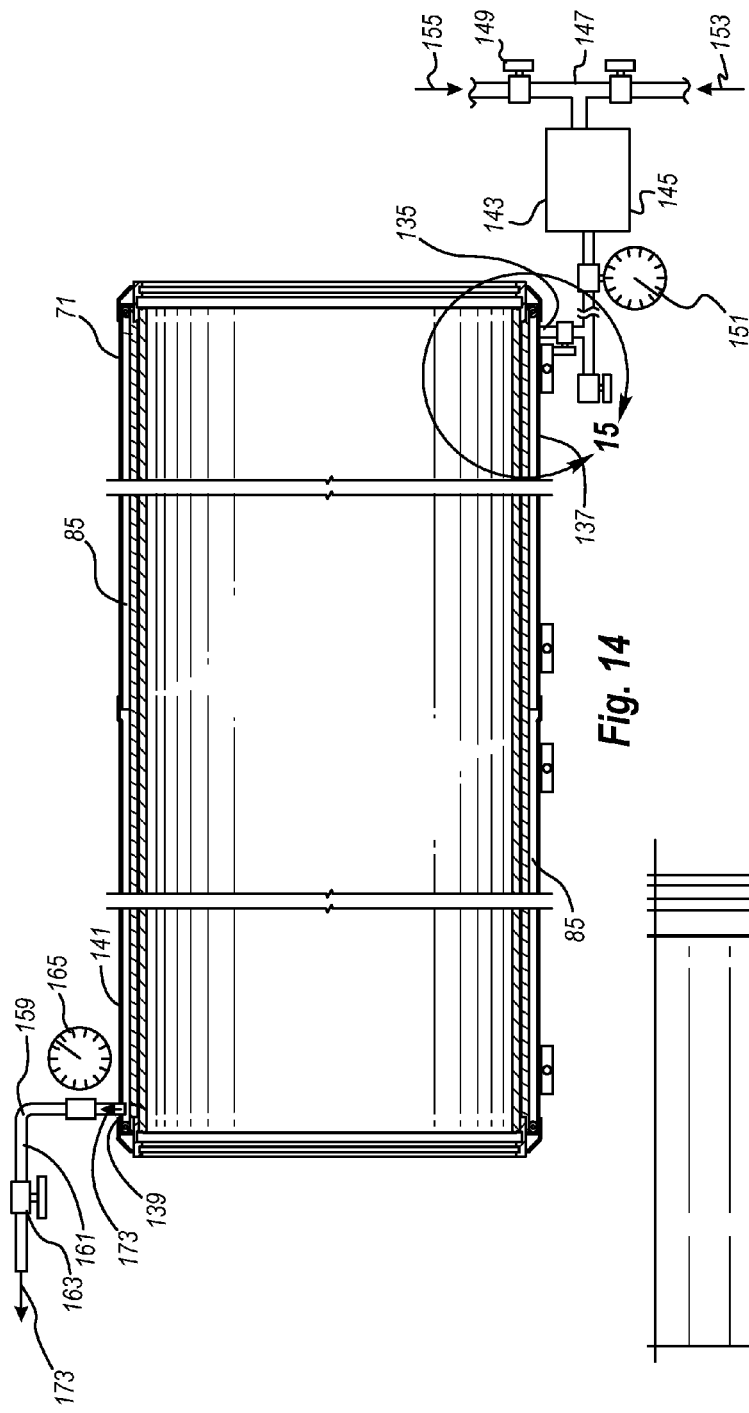
FIG. 14 is an illustration of a preferred embodiment of a medium receiver, medium supply assembly, and vent assembly of the present invention.
Figure 15:
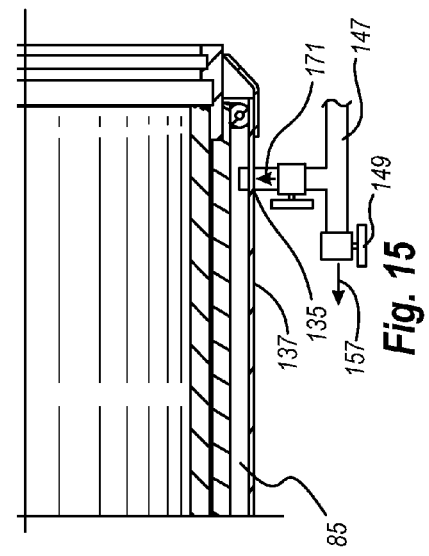
FIG. 15 is an illustration detail of a preferred embodiment of a medium receiver and medium supply assembly of the present invention.

Referring now to FIG. 14 and to FIG. 15, a medium receiver 135 of the present invention for use in injecting the self-hardening medium is shown. For the embodiment of the reinforcement pipe 71 shown, the medium receiver 135 is merely a threaded opening located at or near the enclosure bottom 137. A corresponding medium vent 139 is located at or near the enclosure top 141. For the embodiment shown, the medium vent 139 is also merely a threaded opening in the reinforcement pipe 71. As the self-hardening medium is injected 171 into the annular space 85, air is expelled 173 from the annular space 85 through the medium vent 139. Depending on the diameter and length of the reinforcement pipe 71, the pipeline clearance 59, the type of hardening medium, the existing pipeline material, and the reinforcement pipe material, as well as other factors, more than one medium receiver 135 may be used for a reinforcement pipe 71. Likewise, more than one medium vent 139 may be used.

An embodiment of a medium supply assembly 143 consisting of a medium pump 145, supply piping 147, valves 149, and a pressure gauge 151, provides for the supply, pressurization and injection of the self-hardening medium 153, 171, and for the supply, pressurization and discharge of pump flushing fluid 155, 157. An embodiment of a vent assembly 159 consisting of vent piping 161, valves 163, and a pressure gauge 165, provide for the venting of air 173 from the annular space 85, and, once all the air has been expelled from the annular space 85, then for the containment of the self-hardening medium. The medium supply assembly 143 and the vent assembly 159 shown are merely illustrative as other embodiments for supplying, pressurizing, and injecting the self-hardening medium, and for venting air and flushing pumps and pipes will be known to persons of ordinary skill in the art. Other embodiments of the medium receiver 135, other than the threaded opening shown, for attaching a source of self-hardening medium to the reinforcement pipe, will be known to persons skilled in the art. Similarly, other embodiments of the medium vent 139, other than the threaded opening shown, for attaching the reinforcement pipe to a device for venting air from the reinforcement pipe and containing pressurized medium, will be known to persons skilled in the art. Alternative embodiments of the medium receiver 135 may provide for direct injection of the self-hardening medium into the annular space 85, by a medium receiver which penetrates and is imbedded in the seal ring.

The type of self-hardening medium material preferred by the inventor is a low viscosity, expanding grout made from finely milled constituents. The low viscosity and small particle size of the constituents provide for the medium to readily distribute and completely fill the annular space 85 between the existing pipeline 3 and the reinforcement pipe 71 connecting the front edge annular space 81 and the rear edge annular space 83. The hardened medium will be of an adequate density to transfer the stresses of the pipeline to the reinforcement pipe. Expansion of the medium as it cures provides for uniform bearing and load transfer between the existing pipeline and the reinforcement pipe. Expansion of the medium as it cures pre-stresses the reinforcement pipe, further insuring the "roundness" and hence the true cylindrical nature of the reinforcement pipe. This provides for the ready connection of successive reinforcement pipes for the reinforcement of contiguous segments of an existing pipeline.

In a preferred embodiment of the method of the present invention, the injection of self-hardening medium into the annular space 85 through the medium receiver 135 is accomplished at a pressure that is sufficient, when the annular space is completely filled, to overcome gravitational and other forces on the reinforcement pipe 71 and to force the reinforcement pipe to a true circular cross-section and a true cylindrical shape. In a preferred embodiment of the method of the present invention, a pressure is maintained that is sufficient to preserve the circular cross-section and true cylindrical shape until the self-hardening medium has hardened. As indicated above, the inventor prefers to use an expanding grout as the medium because it expands during curing, rather than shrinking as many grouts do. The end result of this preferred embodiment of the method of the present invention is a true cylindrical reinforcement pipe which carries or reinforces the pressure capacity of the existing pipeline and evenly disburses the hoop stress and the other loads imposed on the reinforcement pipe by the existing pipeline. As stated above, the expanding grout can result in the pre-stressing of the reinforcement pipe, immediately transferring loads to the reinforcement pipe. This can be particularly important in the reinforcement of an existing pipe which is experiencing a failure or deterioration of its hoop stress structural capacity.

If passive centering spacers are used, the spacers will partially yield to the forces of the pressurized annular medium and allow rounding of the enclosure. The intimate contact caused by the annular medium will act to transfer the stresses from the existing pipeline to the new rounded reinforcement pipe enclosure. If the existing pipeline is in the process of structural failure or in need of supplemental structural strength, this reinforcement will act to replace the deficient existing pipeline structural strength and allow continued operation of the existing pipeline.

The rounding of the reinforcement pipe, as described above, assures that the existing pipeline stresses are transferred symmetrically to the reinforcement pipe. This substantially improves the strength of the reinforcement pipe by equalizing the stresses throughout the reinforcement pipe enclosure and optimizes the structural strength of the reinforcement pipe. Thin wall fabricated metallic cylinders are known to be flexible, and roundness must be provided by other means. For the method of the present invention, rounding is provided by sealing both ends of each enclosure segment between the enclosure and the existing pipeline adequately to allow pressurizing the annular space with a self hardening medium. As stated, the use of a pressurized, expansive medium will act to pre-stress the metallic cylinder. Persons of skill in the art familiar with liquid containing pressurized cylindrical structures will readily recognize that the result of pressurizing a flexible metallic cylinder is to cause the cylinder to become substantially round. For the reinforcement pipe of the present invention, this will occur irrespective of the roundness or soundness of the existing pipeline. Unless the enclosure, the reinforcement pipe, is rounded at the time of installation, the stresses of the existing pipe will not be transferred equally and could cause concentrated stresses to the enclosure which in turn could cause the structural failure of the enclosure. The use of a flexible enclosure combined with rounding minimizes the required thickness of the enclosure thereby minimizing the expense of the system. By contrast, a rigid enclosure without such rounding would require substantially increased material thicknesses to achieve the equivalent strength.

Important and unique features of the assembly and the method of the present invention are the use of embodiments of the seal ring 17 and the seal ring retention assembly 93, and the flexible reinforcement pipe 71, to accommodate irregularities in the cross-section of the existing pipeline 3 and accommodate angular displacement in the pipe joint between the existing pipe sections. The reinforcement pipe may be substantially displaced and deformed prior to injection and pressurization of the hardening medium. The flexibility of the seal rings allows rounding of the enclosure while maintaining a seal between the enclosure and the pipeline. Medium pressurization shall be adequate to cause the enclosure to plastically yield into a substantially circular shape. The circular shape shall be maintained until the annular medium has hardened.

Preferred embodiments of this invention are easily adaptable to very large diameter pipelines. Many of the pipelines requiring reinforcement or repair exceed 12 feet in diameter and do not have very consistent external dimensions or have external mortar coatings resulting in an out-of-round external condition. The preferred embodiments of this invention are easily scalable to accommodate very large diameter existing pipelines. The assembly and method of the present invention can also accommodate these external dimension variations and external surface condition variations for the existing pipeline. The preferred embodiments of the seal ring 17 and the seal ring retention assemblies 93 described provide for the reinforcement pipe 71, the seal ring 17, and the seal ring retention assembly 93, to be installed out-of-round. Injection and pressurization of the medium result in rounding of the reinforcement pipe.

The pipe reinforcement assembly 1 and the method of the present invention are intended primarily for use in reinforcing a metallic or cementious existing pipeline 3, and primarily for the use of a metallic reinforcement pipe 71. Although most applications will involve the use of steel, steel alloy, or stainless steel, other types of flexible metallic pipe may be used, depending on the pipe being reinforced.

A plurality of reinforcement pipes 71 may be connected together to provide for a continuous reinforcement, reinforcing a pipeline segment including a plurality of contiguous existing pipeline sections. An expanded pipe end over a plain end interconnection between successive reinforcement pipes has been shown in the drawings, and is a preferred interconnection joint, but other types of joints will be known to persons of ordinary skill in the art in view of the disclosures of this application.

The reinforcement pipe ends may be left, temporarily or permanently, terminated in accordance with one of the details shown in the drawings, or an equivalent, or may be terminated by utilizing a shrink sleeve as shown in FIG. 6F, or incorporate a welded connection to the existing pipeline when used with a metal pipeline. These are common methods and materials for the pipeline construction industry.

The present invention is intended primarily for use with existing pipelines constructed from Pre-stressed Concrete Cylinder Pipe (PCCP), Reinforced Concrete Pipe (RCP), Ductile Steel, Steel, Cast Iron, Polyvinyl Chloride (PVC), fiberglass reinforced plastics and High Density Polyethylene (HDPE) pipe, but may be used with existing pipelines constructed of other materials.

In using the present invention to repair an existing pipeline, such as a pipeline constructed of Pre-stressed Concrete Cylinder Pipe, which may have lost the hoop component of its structural capacity but may have retained the compressive strength of the concrete, the user will benefit by preserving and using the compressive strength characteristic of the pipe while replacing the hoop structure of the existing pipe by the reinforcement pipe of the present invention. A seal ring of the present invention acts to seal the ends of the annular space between the existing pipeline and the reinforcement pipe, even for very irregular surfaces such as those frequently found on pipelines with a concrete exterior. The irregularities are often caused by corrosion, concrete spalling due to exposure or age, or lack of quality in manufacturing.

The use of metallic material, such as steel, for the reinforcement pipe, exposes the reinforcement pipe to corrosion. Depending on the material selected for the self-hardening medium, filling the annular space with the medium potentially results in the protection of the internal surface of the reinforcement pipe from corrosion by passivation of the steel. For example, this can be achieved by utilizing a cementious medium material with a high ph value for a carbon steel reinforcement pipe. This medium material will passivate the steel susceptibility from the effects of corrosion.

The external surface of the reinforcement pipe can be protected with a corrosion resistant coating, and, due to the smooth finished exterior which is free from accessory hardware, sharp edges, bolts, and the like, the coating system can more easily provide protection of the mostly uninterrupted shape of the reinforcement pipe external surface.

As shown in FIG. 1, the existing pipeline 3 may be supported by existing pipeline supports 39 of the present invention, and the reinforcement pipe 71 may be supported by reinforcement pipe supports 41 of the present invention. Other devices may be used to support the existing pipeline so as to prevent damage to the existing pipeline and to position and support the reinforcement pipe so as provide for the proper positioning of the reinforcement pipe with respect to the existing pipeline and to support the reinforcement pipe and the existing pipe, as the reinforcement pipe is constructed, the seal rings and seal retainers are installed, and the medium is injected. The support devices become increasingly valuable when the existing pipeline system is a large diameter and/or the system is buried in the ground.

To facilitate the installation of the enclosure of the present invention, the method of the present invention optionally incorporates the use of devices to support the existing pipeline while allowing adequate space for installing the enclosure. The support of the existing pipeline during installation of the enclosure, i.e. the reinforcement pipe, which may be operating or contain a liquid such as water, is very crucial to the use of the assembly and method of the present invention.

As shown in FIG. 1 and FIG. 2, and generally in several of the other figures, a preferred embodiment of a support system 38 utilizes one or more support wedge assemblies 40 comprising a pair of support wedges 39, such as that shown on FIG. 11, which are slid along a steel plate 129 to transfer the dead load of the pipeline to the ground below the pipeline but outside of the repair zone. This allows the ground within the repair zone to be removed to provide a clearance which facilitates the installation of the enclosure 2. This transfer requires careful controls to assure the pipeline is not shifted or lifted and, therefore, the hydraulics or pneumatic system driving the wedges must have gauges and calculated lifting rates to assure the optimum pressure is exerted under the pipeline. The support wedges 39 are preferably mechanically interconnected 131 to provide for the balanced lifting of the existing pipe. Resilient contact surfaces 125, 127 may reduce damage to the pipe as the support wedges are slid under the pipe.

Once the existing pipeline is adequately supported, one or more support wedge assemblies 40 may also be used to support the enclosure 2, i.e. the reinforcement pipe bottom 15 and the reinforcement pipe top 13, before and after they are joined to form the reinforcement pipe 71, each of which has a pair of support wedges 41, which are also preferably hydraulically or pneumatically actuated. Upon completion of an individual enclosure 2, additional supports may be installed below the enclosure to transfer the pipeline dead load to the enclosure thereby allowing removal of the supports from the existing pipeline and providing access for a contiguous existing pipeline segment to receive an enclosure. The method of the present invention provides for the enclosure of a pipeline segment including a plurality of contiguous existing pipeline sections with a continuous, sealed enclosure.

Other embodiments of the seal ring 17 and seal retention assembly 93 which provide for the installation of reinforcement pipe 71, particularly a flexible reinforcement pipe, out of round and with an angular displacement, will be known to persons of ordinary skill in the art, in view of the disclosures made in this application.

Although the preferred embodiments shown in the drawings of the reinforcement pipe assembly 1 of the present invention are for the reinforcement or repair of existing pipeline segments that are straight, i.e. no bend, in view of the drawings and description presented in this application, variations of the assembly and method of the present invention for use for mitered bends of an existing pipeline that must be reinforced or repaired, will be obvious to persons of skill in the art.

Other embodiments and other variations and modifications of the embodiments described above will be obvious to a person skilled in the art. Therefore, the foregoing is intended to be merely illustrative of the invention and the invention is limited only by the following claims and the doctrine of equivalents.

What is claimed is:

1. A method for reinforcing a pipeline segment, the pipeline segment having a pipe external surface with a pipe external radius, the method providing a capability for reinforcing the pipeline segment wherein the pipeline segment may have an irregular external surface, may be out of round or may have an angular displacement, the method comprising:
   a) enclosing the pipeline segment with two or more metallic, laterally arcuate enclosure plates, each of the enclosure plates having an internal surface with a common and uniform lateral radius of curvature, the radius of curvature being greater than the pipe external radius, the enclosure plates being fitted together longitudinally to form a flexible, cylindrical enclosure for the pipeline segment, the enclosure having an internal surface and opposing ends, a first enclosure end and a second enclosure end;

b) installing a pair of seal rings, a first seal ring and a second seal ring, the first seal ring being inserted at the first enclosure end between the pipe external surface and the enclosure internal surface, and the second seal ring being inserted at the second enclosure end between the pipe external surface and the enclosure internal surface, the seal rings promoting an annular space between the pipe external surface and the enclosure internal surface;

c) installing a pair of seal ring retention assemblies, one for each seal ring;

d) injecting a self-hardening medium into the annular space through one or more hardening medium receivers;

e) pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement; and f) maintaining the pressure of the self-hardening medium at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

2. The method recited in claim 1 wherein the pair of seal ring retention assemblies comprises a pair of seal retainer rings, a first seal retainer ring and a second seal retainer ring, and each retainer ring having an inside radius equal to or slightly greater than the pipe external radius, the first retainer ring being positioned adjacent to the first enclosure end and attached to the pipe or the first enclosure end, and the second retainer ring being positioned adjacent to the second enclosure end and attached to the pipe or the first enclosure end.

3. The method recited in claim 1 wherein each hardening medium receiver is integrated with one of the enclosure plates.

4. The method recited in claim 1 wherein the enclosure plates comprise a reinforcement pipe top and a reinforcement pipe bottom.

5. The method recited in claim 1 wherein the enclosure plates are welded together longitudinally.

6. The method recited in claim 1 wherein the first enclosure end or the second enclosure end is expanded for overlapping the end of a contiguous enclosure, providing for a continuous enclosure.

7. The method recited in claim 1 wherein the seal ring comprises a flexible tubular member with an internal fluid chamber which can be injected with and pressurized with a non-compressible fluid.

8. A method for reinforcing a pipeline segment, the pipeline segment having a pipe external surface with a pipe external radius, the method providing a capability for reinforcing the pipeline segment wherein the pipeline segment may have an irregular external surface, may be out of round or may have an angular displacement, the method comprising:

a) enclosing the pipeline segment with two or more metallic, laterally arcuate enclosure plates, each of the enclosure plates having an internal surface with a common and uniform lateral radius of curvature, the radius of curvature being greater than the pipe external radius, the enclosure plates being fitted together longitudinally to form a flexible, cylindrical enclosure for the pipeline segment, the enclosure having an internal surface and opposing ends, a first enclosure end and a second enclosure end, the first enclosure end having an integral first seal ring retainer and the second enclosure end having an integral second seal ring retainer;

b) installing a pair of seal rings, a first seal ring and a second seal ring, the first seal ring being inserted at the first enclosure end in the integral first seal ring retainer and between the pipe external surface and the enclosure internal surface, and the second seal ring being inserted at the second enclosure end in the integral second seal ring retainer and between the pipe external surface and the enclosure internal surface, the seal rings promoting an annular space between the pipe external surface and the enclosure internal surface;

c) injecting a self-hardening medium into the annular space through one or more hardening medium receivers;

d) pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement; and e) maintaining the pressure of the self-hardening medium at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

9. The method recited in claim 8 wherein each hardening medium receiver is integrated with one of the enclosure plates.

10. The method recited in claim 8 wherein the enclosure plates comprise a reinforcement pipe top and a reinforcement pipe bottom.

11. The method recited in claim 8 wherein the enclosure plates are welded together longitudinally.

12. The method recited in claim 8 wherein the first enclosure end or the second enclosure end is expanded for overlapping the end of a contiguous enclosure, providing for a continuous enclosure.

13. The method recited in claim 8 wherein the seal ring comprises a flexible tubular member with an internal fluid chamber which can be injected with and pressurized with a non-compressible fluid.

14. A method for reinforcing a pipeline segment, the pipeline segment having a pipe external surface with a pipe external radius, the method providing a capability for reinforcing the pipeline segment wherein the pipeline segment may have an irregular external surface, may be out of round or may have an angular displacement, the method comprising:
   a) enclosing the pipeline segment with a reinforcement pipe top and a reinforcement pipe bottom, the reinforcement pipe top and the reinforcement pipe bottom, the reinforcement pipe top and the reinforcement pipe bottom being fitted together longitudinally to form a flexible reinforcement pipe, the reinforcement pipe having an internal surface and opposing ends, a front pipe end and a rear pipe end;
   b) installing a pair of seal rings, a first seal ring and a second seal ring, the first seal ring being inserted at the front pipe end between the pipe external surface and the reinforcement pipe internal surface, and the second seal ring being inserted at the rear pipe end between the pipe external surface and the reinforcement pipe internal surface, the seal rings promoting an annular space between the pipe external surface and the reinforcement pipe internal surface;
   c) installing a pair of seal ring retention assemblies, one for each seal ring;
   d) injecting a self-hardening medium into the annular space through one or more hardening medium receivers;
   e) pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement; and
   f) maintaining the pressure of the self-hardening medium at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

15. The method recited in claim 14 wherein the pair of seal retention assemblies comprises a pair of seal retainer rings, a first seal retainer ring and a second seal retainer ring, and each retainer ring having an inside radius equal to or slightly greater than the pipe external radius, the first retainer ring being positioned adjacent to the first enclosure end and attached to the pipe or the first enclosure end, and the second retainer ring being positioned adjacent to the second enclosure end and attached to the pipe or the first enclosure end.

16. The method recited in claim 14 wherein each hardening medium receiver is integrated with the reinforcement pipe top or the reinforcement pipe bottom.

17. The method recited in claim 14 wherein the reinforcement pipe top and the reinforcement pipe bottom are welded together longitudinally.

18. The method recited in claim 14 wherein the front pipe end or the rear pipe end is expanded for overlapping the end of a contiguous reinforcement pipe, providing for a continuous enclosure.

19. The method recited in claim 14 wherein the seal ring comprises a flexible tubular member with an internal fluid chamber which can be injected with and pressurized with a non-compressible fluid.

20. A pipeline segment reinforcement assembly, the pipeline segment having a pipe external surface with a pipe external radius, the reinforcement assembly providing a capability for reinforcing the pipeline segment wherein the pipeline segment may have an irregular external surface, may be out of round or may have an angular displacement, the reinforcement assembly comprising:
   two or more metal, laterally arcuate, flexible enclosure plates, each of the enclosure plates having an internal surface with a common and uniform lateral radius of curvature, the radius of curvature being greater than the pipe external radius, the enclosure plates being positionable together longitudinally to form a flexible, cylindrical enclosure for the pipeline segment, the enclosure having an internal surface and opposing ends, a first enclosure end and a second enclosure end;
   a pair of seal rings, a first seal ring and a second seal ring, each seal ring being comprised of one or more seal ring segments, the first seal ring being dimensioned for insertion at the first enclosure end between the pipe external surface and the enclosure internal surface, and the second seal ring being dimensioned for insertion at the second enclosure end between the pipe external surface and the enclosure internal surface with the seal rings promoting an annular space between the pipe external surface and the enclosure internal surface;
   a pair of seal ring retention assemblies, one for each seal ring;
   one or more hardening medium receivers; and
   a medium supply assembly having a capability for injecting a self-hardening medium through the one or more hardening medium receivers to the annular space, pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement, and maintaining the pressure of the self-hardening medium in the annular space at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

21. The pipeline segment reinforcement assembly recited in claim 20 wherein the pair of seal ring retention assemblies comprises a pair of seal retainer rings, a first seal retainer ring and a second seal retainer ring, and each retainer ring having an inside radius equal to or slightly greater than the pipe external radius, the first retainer ring being positioned adjacent to the first enclosure end and attached to the pipe or the first enclosure end, and the second retainer ring being positioned adjacent to the second enclosure end and attached to the pipe or the first enclosure end.

22. The pipeline segment reinforcement assembly recited in claim 20 wherein each hardening medium receiver is integrated with one of the enclosure plates.

23. The pipeline segment reinforcement assembly recited in claim 20 wherein the enclosure plates comprise a reinforcement pipe top and a reinforcement pipe bottom.

24. The pipeline segment reinforcement assembly recited in claim 20 wherein the enclosure plates are welded together longitudinally.

25. The pipeline segment reinforcement assembly recited in claim 20 wherein the first enclosure end or the second enclosure end is expanded for overlapping the end of a contiguous enclosure, providing for a continuous enclosure.

26. The pipeline segment reinforcement assembly recited in claim 20 wherein the seal ring comprises a flexible tubular member with an internal fluid chamber which can be injected with and pressurized with a non-compressible fluid.

27. A pipeline segment reinforcement assembly, the pipeline segment having a pipe external surface with a pipe external radius, the reinforcement assembly providing a capability for reinforcing the pipeline segment wherein the pipeline segment may have an irregular external surface, may be out of round or may have an angular displacement, the reinforcement assembly comprising:

two or more metal, laterally arcuate, flexible enclosure plates, each of the enclosure plates having an internal surface with a common and uniform lateral radius of curvature, the radius of curvature being greater than the pipe external radius, the enclosure plates being positionable together longitudinally to form a flexible, cylindrical enclosure for the pipeline segment, the enclosure having an internal surface and opposing ends, a first enclosure end and a second enclosure end, the first enclosure end having an integral first seal ring retainer and the second enclosure end having a integral second seal ring retainer;

a pair of seal rings, a first seal ring and a second seal ring, the first seal ring being dimensioned for insertion at the first enclosure end in the integral first seal ring retainer and between the pipe external surface and the enclosure internal surface, and the second seal ring being dimensioned for insertion at the second enclosure end in the integral second seal ring retainer and between the pipe external surface and the enclosure internal surface with the seal rings promoting an annular space between the pipe external surface and the enclosure internal surface;

one or more hardening medium receivers; and a medium supply assembly having a capability for injecting a self-hardening medium through the one or more hardening medium receivers to the annular space, pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement, and maintaining the pressure of the self-hardening medium in the annular space at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

28. The pipeline segment reinforcement assembly recited in claim 27 wherein each hardening medium receiver is integrated with one of the enclosure plates.

29. The pipeline segment reinforcement assembly recited in claim 27 wherein the enclosure plates comprise a reinforcement pipe top and a reinforcement pipe bottom.

30. The pipeline segment reinforcement assembly recited in claim 27 wherein the enclosure plates are welded together longitudinally.

31. The pipeline segment reinforcement assembly recited in claim 27 wherein the first enclosure end or the second enclosure end is expanded for overlapping the end of a contiguous enclosure, providing for a continuous enclosure.

32. The pipeline segment reinforcement assembly recited in claim 27 wherein the seal ring comprises a flexible tubular member with an internal fluid chamber which can be injected with and pressurized with a non-compressible fluid.

33. A pipeline segment reinforcement assembly, the pipeline segment having a pipe external surface with a pipe external radius, the reinforcement assembly providing a capability for reinforcing the pipeline segment wherein the pipeline segment may have an irregular external surface, may be out of round or may have an angular displacement, the reinforcement assembly comprising:

two or more metal, laterally arcuate, flexible enclosure plates, a reinforcement pipe top and a reinforcement pipe bottom, the reinforcement pipe top and the reinforcement pipe bottom, having an internal surface with a common and uniform lateral radius of curvature, the radius of curvature being greater than the pipe external radius, the reinforcement pipe top and reinforcement pipe bottom being positionable together longitudinally to form a reinforcement pipe, a flexible, cylindrical enclosure for the pipeline segment, the reinforcement pipe having an internal surface and opposing ends, a reinforcement pipe front end and a reinforcement pipe rear end;

a pair of seal rings, a first seal ring and a second seal ring, the first seal ring being dimensioned for insertion at the first reinforcement pipe front end between the pipe external surface and the reinforcement pipe internal surface, and the second seal ring being dimensioned for insertion at the reinforcement pipe rear end between the pipe external surface and the reinforcement pipe internal surface with the seal rings promoting an annular space between the pipe external surface and the reinforcement pipe internal surface;

a pair of seal ring retention assemblies, one for each seal ring;

one or more hardening medium receivers; and a medium supply assembly having a capability for injecting a self-hardening medium through the one or more hardening medium receivers to the annular space, pressurizing the self-hardening medium in the annular space to a rounding pressure, the rounding pressure providing for rounding of the flexible cylindrical enclosure and achievement of a true cylindrical shape by the enclosure, self-hardening medium pressurization being adequate to cause the enclosure to plastically yield into a substantially circular shape, each seal ring and seal retention assembly allowing rounding of the flexible enclosure and achievement of a true cylindrical shape by the enclosure though the pipeline segment may have an irregular external surface, may be out of round or may have an angular displacement, and maintaining the pressure of the self-hardening medium in the annular space at a pressure equaling or exceeding the rounding pressure until the self-hardening medium has hardened, the true cylindrical shape of the enclosure, irrespective of surface irregularities or angular displacement of the pipeline segment, and the hardened medium providing for a transfer of and an even distribution of all or a substantial portion of hoop stress from the pipeline segment to the enclosure during pressurized use of the pipeline segment.

34. The pipeline segment reinforcement assembly recited in claim 33 wherein the pair of seal ring retention assemblies comprises a pair of seal retainer rings, a first seal retainer ring and a second seal retainer ring, and each retainer ring having an inside radius equal to or slightly greater than the pipe external radius, the first retainer ring being positioned adjacent to the first enclosure end and attached to the pipe or the first enclosure end, and the second retainer ring being positioned adjacent to the second enclosure end and attached to the pipe or the first enclosure end.

35. The pipeline segment reinforcement assembly recited in claim 33 wherein each hardening medium receiver is integrated with the reinforcement pipe top or the reinforcement pipe bottom.

36. The pipeline segment reinforcement assembly recited in claim 33 wherein the reinforcement pipe top and the reinforcement pipe bottom are welded together longitudinally.

37. The pipeline segment reinforcement assembly recited in claim 33 wherein the front pipe end or the rear pipe end is expanded for overlapping the end of a contiguous reinforcement pipe, providing for a continuous enclosure.

38. The pipeline segment reinforcement assembly recited in claim 33 wherein the seal ring comprises a flexible tubular member with an internal fluid chamber which can be injected with and pressurized with a non-compressible fluid.

* * * * *